United States Patent [19]

Kamada

[11] Patent Number: 5,595,560
[45] Date of Patent: Jan. 21, 1997

[54] DIE MANAGEMENT METHOD FOR PUNCH PRESS

[75] Inventor: Ikuo Kamada, Komatsu, Japan

[73] Assignee: Kabushiki Kaisha Komatsu Seisakusho, Tokyo, Japan

[21] Appl. No.: 446,740

[22] PCT Filed: Oct. 14, 1994

[86] PCT No.: PCT/JP94/01735

§ 371 Date: Jun. 6, 1995

§ 102(e) Date: Jun. 6, 1995

[87] PCT Pub. No.: WO95/11098

PCT Pub. Date: Apr. 27, 1995

[30] Foreign Application Priority Data

Oct. 19, 1993 [JP] Japan .................................. 5-260910
Dec. 24, 1993 [JP] Japan .................................. 5-327655

[51] Int. Cl.⁶ .................................................. B23Q 3/155
[52] U.S. Cl. ............................. 483/1; 72/442; 83/481; 83/559; 364/474.21; 483/29
[58] Field of Search ............................ 483/1, 28, 29; 72/446, 442; 83/563, 559, 566, 481, 479, 552; 364/474.21

[56] References Cited

U.S. PATENT DOCUMENTS 5,046,014  9/1991  Anjo ..................................... 483/28 X
5,193,421  3/1993  Meisinger ................................ 483/1
5,248,924  9/1993  Niwa ................................ 364/474.02

FOREIGN PATENT DOCUMENTS

58-222828  12/1983  Japan .
 274458  11/1990  Japan ............................ 364/474.21
3-81032   4/1991  Japan .
3-28248   4/1991  Japan ................................... 483/1
3-248726  11/1991  Japan .
2001522   2/1992  WIPO ........................... 364/474.21

Primary Examiner—William R. Briggs
Attorney, Agent, or Firm—Nikaido, Marmelstein, Murray & Oram LLP

[57] ABSTRACT

For die arrangement, bar code tags which correspond to identification numbers given to a punch and die to be attached to a punch press are read by a bar code reader, and die information on the punch and die as well as die assembly information on a die assembly in which the punch and die are paired for pressing operation are stored in a non-volatile memory. In connection with the die assembly information, the address of the die assembly stocked in the punch press is stored. When starting pressing operation, the die assembly is fetched according to the die assembly information to perform die replacement.

12 Claims, 5 Drawing Sheets

DIE MANAGEMENT METHOD FOR PUNCH PRESS

TECHNICAL FIELD

The present invention relates to a die management method for a punch press equipped with a die replacement system.

BACKGROUND ART

Turret punch presses are generally used as a press tool for making blanks of a plurality of certain shapes with a single machine. A turret punch press comprises a pair of upper and lower turrets which have upper dies (i.e., punches) and lower dies (i.e., dies) respectively and punches a workpiece, setting the upper and lower dies in positions under a hammer by indexing. A turret punch press can deal with a comparatively small number of lots, say, 100 to 5000 lots so that they are used in the field as a machine tool suited for use in small quantity production of multiple kinds of items.

In recent years, there have arisen strong demands in the market to sales of multiple items in a small number of lots with short delivery times and under such a situation, conventional turret punch presses, in which the maximum number of dies which can be attached is only about 70, can no longer adjust themselves to the market demand.

To overcome this problem, one turret punch press provided with an automatic die replacement system has been proposed and put to practical use. According to this press tool, a die storage (i.e., die repository) for storing a number of dies is incorporated in or installed separately from the turret punch press and the automatic die replacement system supplies dies to the pressing head from the die storage.

In such a turret punch press provided with an automatic die replacement system, dies to be used for pressing operation are required to be supplied quickly and reliably from the die storage to the pressing head and therefore it is necessary to assure the effective management of, for example, the address of each die in the die storage and data on the number of times each die has been used. One die management method is disclosed in Japanese Patent Publication No. 4-50088 (1992), in which a die number is assigned to each die and the shape and size of each die is registered in a master file with its corresponding die number and in which data on the number of times each die has been used is updated to register in the master file. In this method, the die management is usually performed with a die number assigned to either upper or lower die.

In the case of a turret punch press, an upper die and lower die are used in a pair and the use of upper and lower dies in different combinations enables it to produce a variety of articles different in thickness and material. In cases where upper and lower dies are used in different combinations, if the above conventional die management method is adapted, that is, the management of upper and lower dies is performed for example by the use of information on lower dies only, the durability, die clearance and other information of individual dies cannot be administered. This obviously makes it difficult to ensure the effective management of information necessary for die arrangement for punching operation and the automation of punching operation.

In addition, a die is accessed indirectly with its address in the die storage in the conventional die management method, so that in the event of a failure in the storage arrangement of dies, proper pressing operation cannot be performed resulting in defective products.

The invention has been made to overcome the above problems and therefore one of the objects of the invention is to provide a die management method for a punch press, which not only enables the effective management of information necessary for die arrangement for punching operation and the perfect automation of die replacement but also reduces the possibility of production of defective articles.

DISCLOSURE OF THE INVENTION

It should be noted that the invention has been made based on the concept that each upper die is paired up with a lower die to form a "die assembly" and the management of such die assemblies is performed in accordance with "die assembly information", that is, information on each die assembly.

According to the invention, there is provided a die management method for a punch press provided with a die replacement system, the method comprising the steps of:

storing die information on an upper die and on a lower die to be used for pressing operation and storing die assembly information on a die assembly in which the upper and lower dies are combined in a pair;

storing information on the address of the die assembly stocked in the punch press in connection with the die assembly information; and performing die replacement by fetching the die assembly according to the die assembly information to start punching operation.

In the method of the invention, there are upper and lower dies necessary for punching operation which individually have their own information and when particular upper and lower dies are supplied to the punch press, their corresponding information pieces are stored. At the same time, die assembly information on the die assembly, that is the combination of the particular upper and lower dies, is stored. Then, information on the address of the die assembly stocked in the punch press is stored in connection with the stored die assembly information and when starting pressing operation, the desired die assembly is fetched based on the die assembly information. Whenever pressing operation is performed with a desired die assembly in this way, information on the number of times the upper die has been used as well as the same information associated with the lower die are respectively updated and stored in a numerical control unit or in the dies themselves after completion of the operation. Similarly, whenever an upper or lower die is reground, information on the grinding history of the die is updated and stored in the numerical control unit or in the die itself. If upper and lower dies are recombined, die assembly information on the new combination is prepared and stored.

The die assembly information and address information may be stored in the numerical control unit incorporated in the punch press or in an external numerical control unit installed separately from the punch press.

The die assembly information preferably includes shape, size and die clearance.

In a preferred embodiment of the invention, die information on each die comprises fixed data and update data, and the fixed data may be stored in the corresponding die itself while the update data may be stored in the numerical control unit of the punch press. In this case, the fixed data preferably includes the production number and manufacturing date of the die. It is possible that a bar code is marked on the surface of a die and this bar code is read by a reader so that the fixed data can be input in the numerical control unit. An alternative is that an identification number is marked on the surface of each die and a bar code tag corresponding to the identification number is separately provided to be read by a reader so that the fixed data can be input in the numerical control unit.

In another embodiment, all the contents of the die information may be held by its corresponding die itself. In this case, a magnetic chip may be embedded in the die or alternatively an IC chip is embedded in the die, in order to hold the die information.

According to the invention, when inputting the respective die information on upper and lower dies, it is preferable that the shapes, sizes and clearances of the upper and lower dies be compared in order to judge whether or not the particular combination of these dies is appropriate. In this case, if the upper and lower dies have the same shape and same size or if the upper and lower dies have different sizes but the same shape on condition that the clearance falls within an allowable range, the combination of these dies is judged to be appropriate.

In the die management method according to the invention, the management of dies is performed based on die assembly information on each die assembly in which an upper die is paired up with a lower die, so that not only the effective management of die durability but also the perfect automation of die replacement can be performed to completely eliminate defective products.

Other objects of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

FIGS. 1 to 5 provide illustrations of an embodiment of a die management method for a punch press according to the invention;

BEST MODE FOR CARRYING OUT THE INVENTION

Referring now to the drawings, a preferred embodiment of a die management method for a punch press according to the invention will be described.

Figure 1:
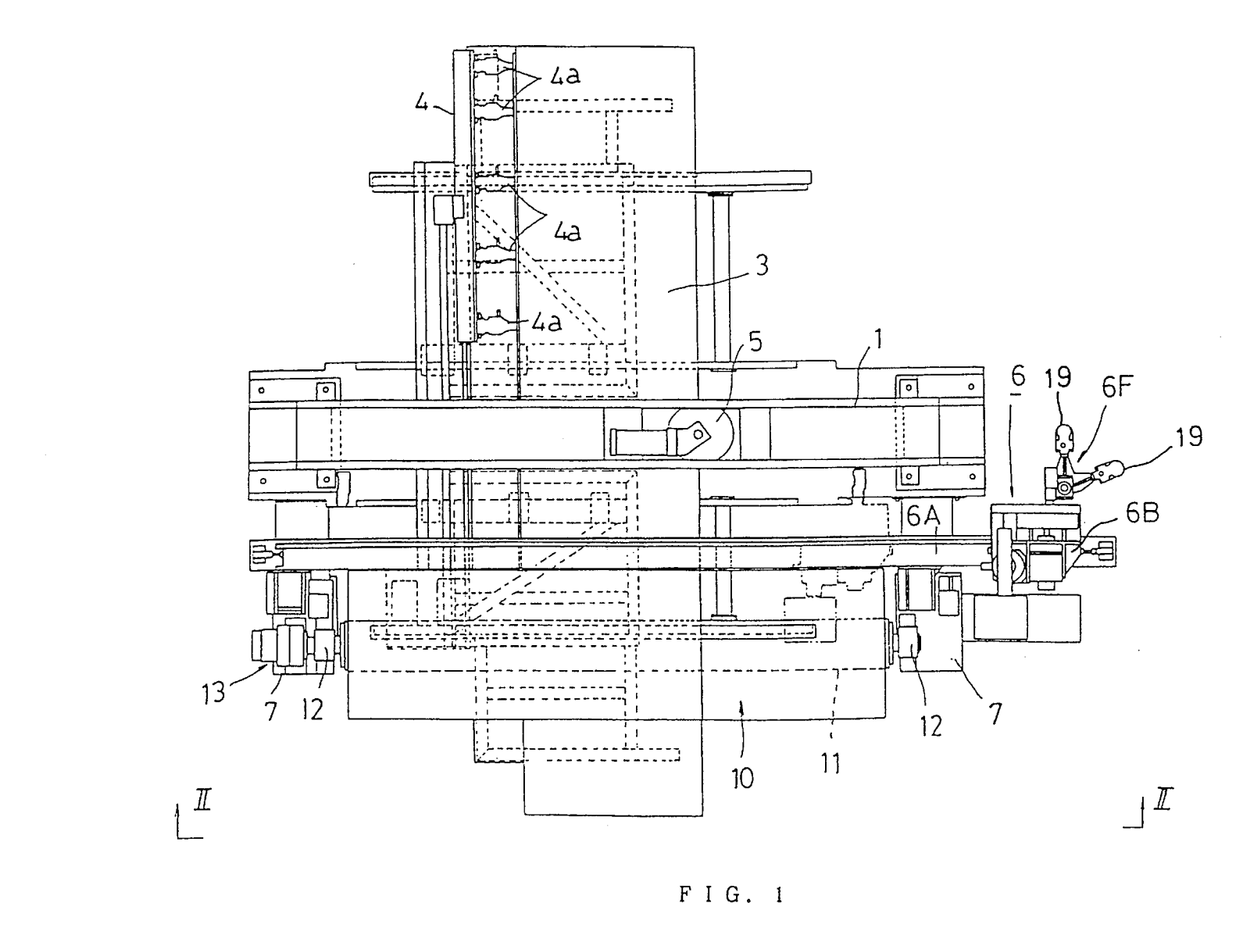
FIG. 1 is a plan view of a punch press used in the embodiment of the invention.
Figure 2:
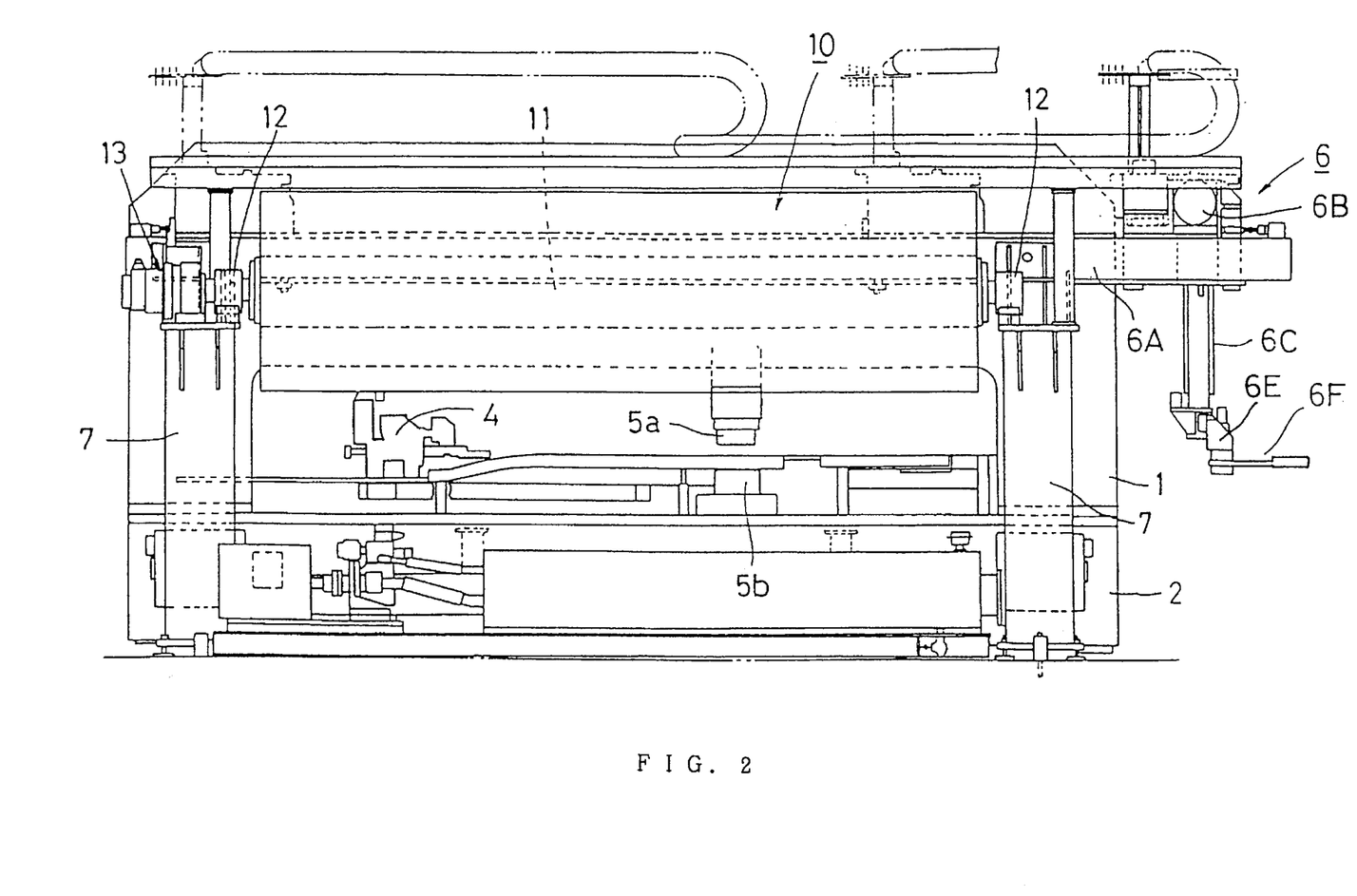
FIG. 2 is a front view taken on line II—II of FIG. 1.
Figure 3:
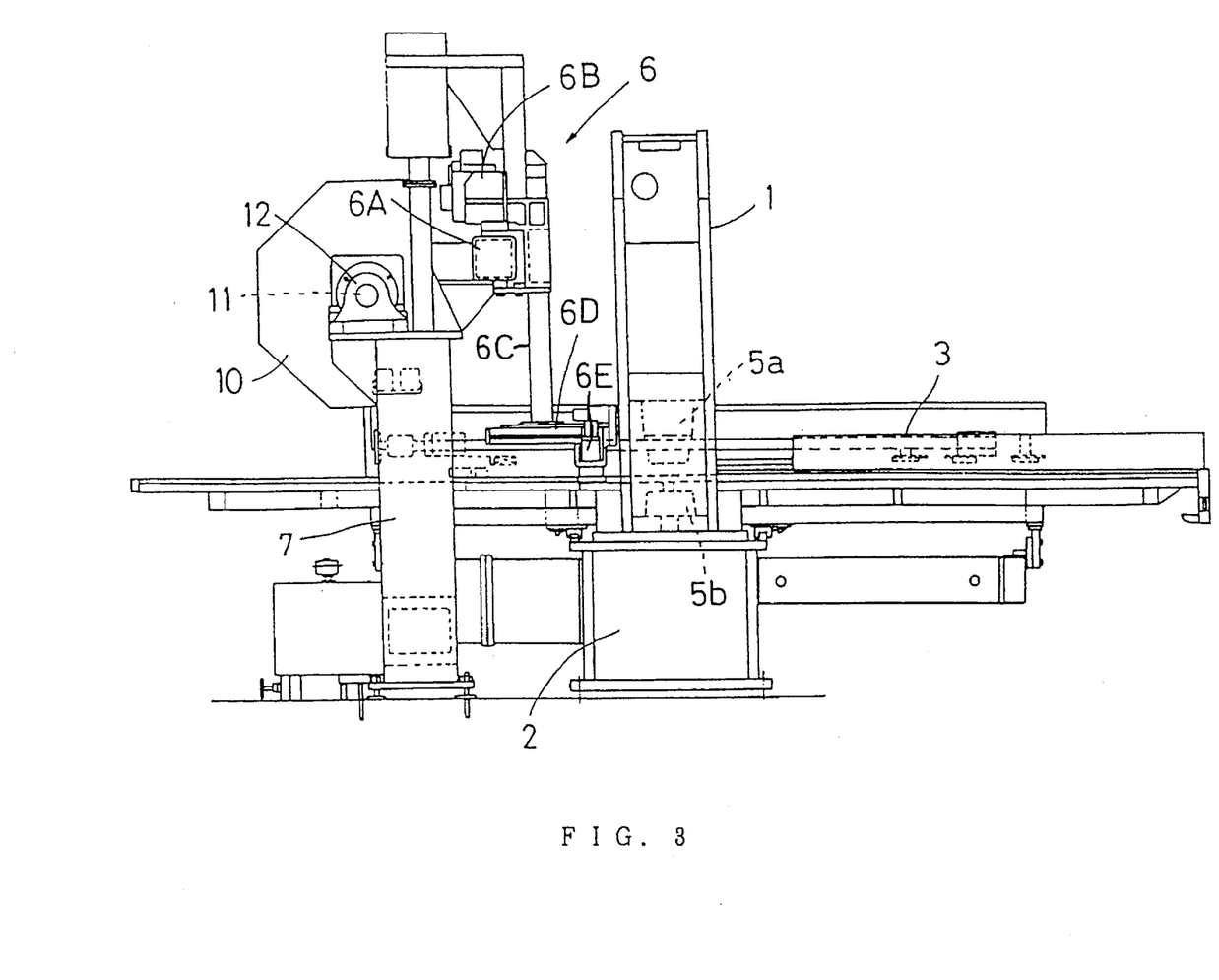
FIG. 3 is a right side view of the punch press shown in FIG. 2.

FIGS. 1 to 3 show the whole construction of a punch press used in one embodiment of the invention. More specifically, FIG. 1 shows a plan view of a punch press, FIG. 2 shows a view taken on line II—II of FIG. 1, and FIG. 3 shows a right side view of the punch press shown in FIG. 2.

In the punch press of this embodiment, a main frame 1 having a portal structure stands upright on a fixed bed 2 and a movable table 3 transverse to the main frame 1 is disposed under the main frame 1, as shown in these figures. A pressing center 5 is vertically disposed such that its axis is located at a position that is slightly shifted from the middle of the main frame 1 in the longitudinal direction thereof. In the pressing center 5, there are provided a pressing head 5a and a fixed base 5b. The pressing head 5a is positioned at the lower end of a ram which moves downward for operation. The fixed base 5b on which a lower die is to be mounted is so positioned on the fixed bed 2 as to face the pressing head 5a. One side of the movable table 3 is provided with a work carriage 4 with a work clamp 4a. The movable table 3 and carriage 4 carry workpieces mounted thereon in a known method.

At a position a predetermined distance away from the main frame 1, a prismatic tubular, die magazine 10 is disposed with its axis parallel to the main frame 1. Provided between the die magazine 10 and the main frame 1 is a die delivery system 6. The die delivery system 6 comprises (i) a rail 6A extending in parallel with the die magazine 10 and with the main frame 1; (ii) an ATC (Automatic Tool Changer) carriage 6B movable along the rail 6A; (iii) a lifting shaft frame 6C that can be lifted and lowered in relation to the ATC carriage 6B; (iv) a traveling shaft frame 6D horizontally disposed at the lower end of the lifting shaft frame 6C; (v) a carrier 6E movable along the traveling shaft frame 6D; and (vi) a die hand 6F that is horizontally turnable about a specified angle in relation to the carrier 6E. The rail 6A is so formed to project, at one end (the right end in FIGS. 1 and 2), from the main frame 1 and the die magazine 10. On one side (the lower side in FIG. 1) of the projecting portion, a conveyer for delivery of material (not shown) is provided. On the other side (the upper side in FIG. 1) of the projecting portion opposite to the material conveyer, there is a replacement position where a worn-out die is replaced with a new one.

The die magazine 10 lies laterally above supporting frames 7, being rotatably supported on bearings 12 at both ends thereof. These supporting frames 7 are formed separately from the main frame 1. The die magazine 10 comprises (i) a support shaft 11 journaled on the bearings 12; (ii) a number of die holding units (not shown) that are fixedly attached to the support shaft 11, being aligned on the circumference of the support shaft 11 and in the axial direction of the shaft 11; and (iii) magazine dividing and actuating means 13 for dividing the circumference of the support shaft 11 to obtain rotation angles and rotating the support shaft 11 about the rotation angles. Each die holding unit is composed of a plurality of die holders 14 (see FIG. 4). More specifically, three die holders 14 are aligned at equal intervals in a row in the circumferential direction of the support shaft 11 and five rows of die holders 14 are arranged in the axial direction of the support shaft 11, so that fifteen die holders 14 are included in each die holding unit. Four die holding units each composed of fifteen die holders 14 are disposed in a row around the support shaft 11, and five such rows are arranged in the axial direction of the support shaft 11, so that twenty die holding units are provided in total. Accordingly, three hundred die assemblies 15 can be stocked in total in the die magazine 10.

Figure 4:
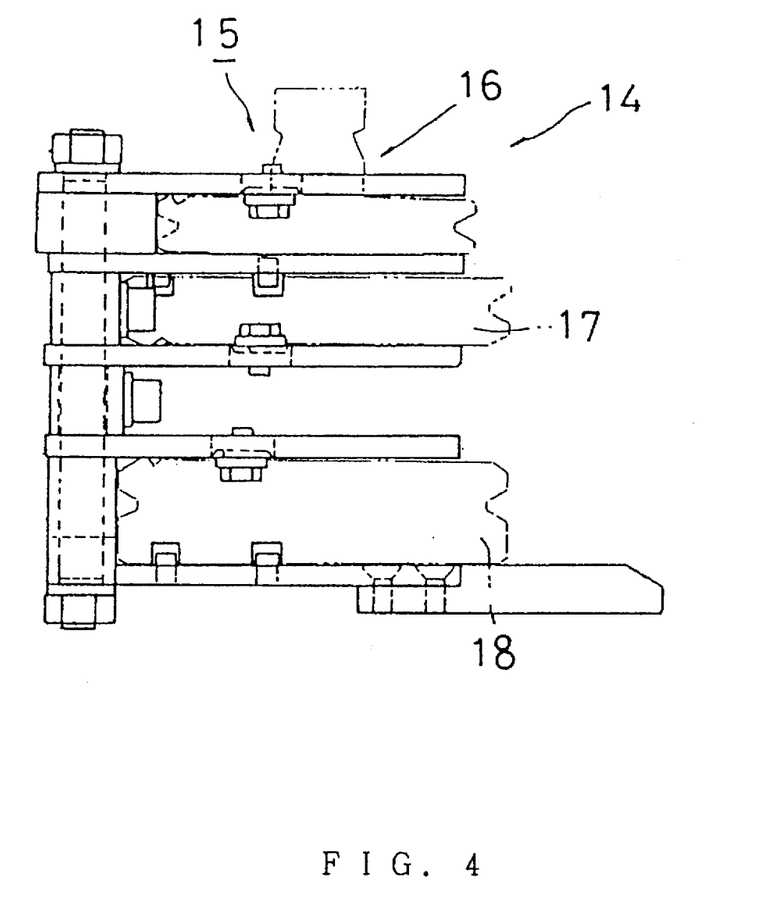
FIG. 4 is a side view of a die holder as it holds dies.

As shown in FIG. 4, each die assembly 15 comprises a punch (upper die) 16, a stripper 17 incorporated in the punch 16, and a die (lower die) 18. These three members are grouped in a set and held at the die holding position of each die holder 14.

The die hand 6F is horizontally turnable about a specified angle in relation to the carrier 6E as mentioned earlier, and can be lifted and lowered between a level corresponding to the position where the die assembly 15 is transferred from and to the die magazine 10 and a level corresponding to the position where the die assembly 15 is mounted on the pressing head 5a and the fixed base 5B of the pressing center 5 for replacement. The die hand 6F has two arms 19 which together have a V-shaped configuration in their plan view and project from a base part on which the die hand 6F turns. Each arm 19 has, at its leading end, a gripping mechanism (not shown) for gripping the die assembly 15.

The punch press having the above construction is connected to an NC device for driving the punch press under its control. The NC device is driven according to an NC program sent from a host computer or FDD system (not shown).

Figure 5:
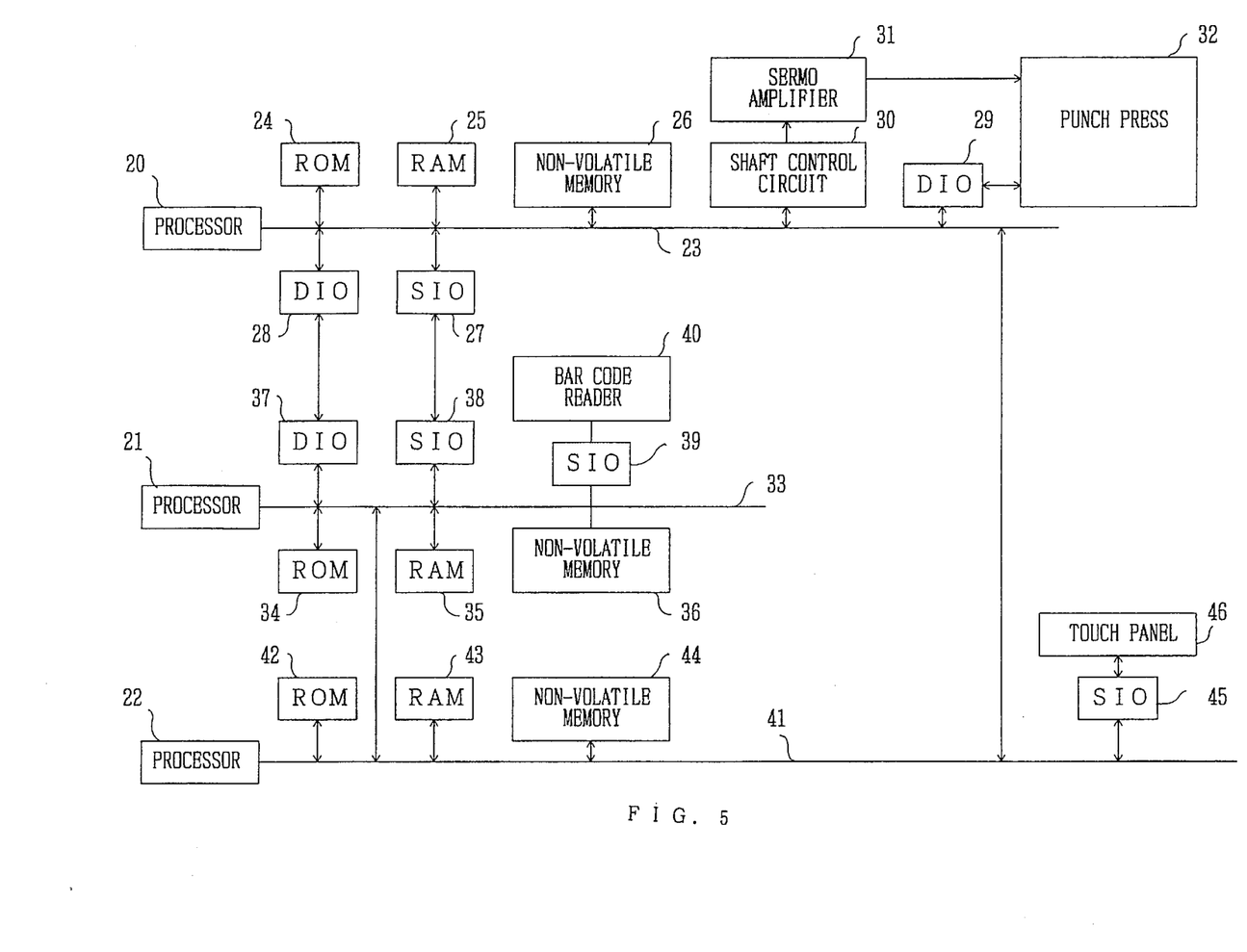
FIG. 5 is a block diagram of a numerical control unit used for automatic die replacement control.

FIG. 5 shows a block diagram of a numerical control unit for performing automatic die replacement control (ATC control).

As shown in FIG. 5, the numerical control unit has three processors 20, 21 and 22. The processor 20 is connected through a system bus 23 to a ROM 24, RAM 25, non-volatile memory 26, serial I/O (SIO) 27, and two digital I/Os (DIO) 28, 29. The processor 20 is also connected to a shaft control circuit 30 for controlling the rotation of the die magazine 10, travel of the carriage 6B, lifting/lowering and to and fro movement of the carrier 6E and turning of the die hand 6F. The shaft control circuit 30 is connected to servo amplifiers 31 which are in turn connected to driving motors for driving their corresponding shafts of a punch press 32, respectively. The punch press 32 is also connected to the digital I/O (DIO) 29.

The processor 21 is connected through a system bus 33 to a ROM 34, RAM 35, non-volatile memory 36, digital I/O (DIO) 37 and two serial I/Os (SIO) 38, 39. The serial I/O (SIO) 39 is connected to a bar code reader 40 for reading die information etc.

The processor 22 is connected through a system bus 41 to a ROM 42, RAM 43, non-volatile memory 44, and serial I/O (SIO) 45. The serial I/O (SIO) 45 is connected to a touch panel 46 through which various kinds of information can be input.

The system buses 23 and 41 are connected to each other while the system buses 33 and 41 are connected to each other. The digital I/Os (DIO) 28 and 37 are connected to each other while the serial I/Os (SIO) 27 and 38 are connected to each other.

In this embodiment, the punches 16 and dies 18 respectively carry their own die information (i.e., punch data and die data) such as shape and punch height. Information on each die assembly 15 (common data), that is, information on a combination of the punch 16, die 18 and stripper 17 is generated and according to this die assembly information, the die management is performed.

Concretely, each of the punches 16 and dies 18 has its own identification number marked by laser marking or the similar method and bar code tags corresponding to the respective identification numbers are affixed to a bar code management panel provided in an operation arrangement section. When making arrangements for operation, the bar code tags corresponding to the identification numbers of a desired punch 16 and die 18 to be mounted are read by the bar code reader 40, so that die information as well as storage data (i.e., storage address information) in the die magazine 10 are input in the non-volatile memory 36. The bar code data on the punch 16 includes shape (e.g., elongated rectangular shape), size (e.g., 5×50 ram), punch height, manufacturing date, and production number. The bar code data on the die 18 includes shape, size, clearance (e.g., 0.2 mm), die height, manufacturing date and production number. Input in the numerical control unit are common data that is common to the punch 16 and die 18, punch data and die data. The common data includes shape, size and clearance. The punch data includes punch height, the amount of reduced height, the number of punching operations which have been performed with the punch 16 (hereinafter referred to as "the number of punching operations"), the limit number of punching operations which can be performed with the punch 16 (hereinafter referred to as "the limit number of punching operations"), manufacturing date and production number. The die data includes die height, the amount of reduced height, the number of punching operation which have been performed with the die 18, the limit number of punching operations which can be performed with the die 18, manufacturing date and production number.

In the punch press employed in this embodiment, when stocking a new punch 16 and die 18 in the die magazine 10, data on such a punch 16 and die 18 is prepared in the following procedure.

The operator operates the bar code reader 40 to read the bar codes of the punch 16 and die 18 and the numerical control unit then makes a check to determine if the shape of the punch 16 is the same as that of the die 18. If they differ from each other, the combination is determined to be an error. If the punch 16 and die 18 have the same shape, a check is then made to determine if the size of the punch 16 is equal to that of the die 18. If they are the same in shape and size, this particular combination is determined to be appropriate and data on the combination is input. On the other hand, if they have the same shape but different sizes, a check is then made to determine if the closed curve a of the outer blade of the punch 16 obtained from the size of the punch 16 is included in a closed curve b which is obtained by expanding the closed curve of the inner blade of the die 18 (this closed curve is obtained from the size of the die 18)equally in outward directions by an amount equivalent to the clearance of the die 18. A check is also made to determine if the closed curves a and b are coincident at any positions. If they are not equal, the die combination is determined to be an error, whereas if they are coincident, the operator determines whether the distance between the closed curves a and b is set as a new clearance.

Of the common data on the punch 16 and die 18 obtained in this way, shape data and size data are obtained from the bar code data of the punch 16. As to clearance data, it may be obtained from the bar code data of the die 18, or alternatively a new value may be calculated in the way described earlier. Of the punch data on the punch 16, punch height, manufacturing date and production number are obtained from the bar code data of the punch 16, and the amount of reduced height and the number of punching operations are set to zero. The limit number of punching operations is input by the operator through the touch panel 46. Of the die data on the die 18, die height, manufacturing date and production number are obtained from the bar code data of the die 18, and the amount of reduced height and the number of punching operations are set to zero. The limit number of punching operations is input by the operator through the touch panel 46.

Information on the die assembly 15 to be used (i.e., die assembly information) is added to pressing program data that is prepared to operate the punch press 32 and operation commands are released based on the die assembly information.

With such arrangement, after starting the pressing program, the desired die assembly 15 stocked in the die magazine 10 is accessed in accordance with its die assembly information while the storage address corresponding to the die assembly information is selected. For taking out the desired die assembly 15 by the die hand 6F, the shaft control circuit 30 is controlled by the processor 20. Accordingly, rotation of the die magazine 10, travel of the carriage 6B, lifting/lowering and to and fro movement of the carrier 6E, and turning of the die hand 6F are respectively performed, so that the die assembly 15 is taken out of the die magazine 10, being retained by the die hand 6F and delivered to the pressing center 5 where the punch 16, stripper 17 and die 18 are respectively attached to the pressing head 5a and the fixed base 5b. In this case, if the number of punching operations in the punch data or die data exceeds the corresponding limit number of punch operations, this die assembly 15 will not be selected even though their common data is appropriate.

In the meantime, control data supplied to a pressing control unit (not shown) for performing pressing operation with the die assembly 15 mounted on the pressing center 5 is input in the non-volatile memory 36 through a serial I/O (not shown), whereby the data on the number of times the particular die assembly 15 has been used, which is stored in the non-volatile memory 36, can be updated. Accordingly, each time punching is performed during a pressing operation, the number of punching operations in the punch data and that in the die data, which correspond to the punch 16 and die 18 presently attached to the pressing center 5 and which are stored in the numerical control unit, are respectively incremented by one.

If the number of punching operations for either of the punch 16 or die 18 exceeds its corresponding limit number, the die assembly having such a punch or die is taken out of the die magazine 10 and put back to the magazine 10 after grinding. This case will be described below.

When taking a desired die assembly 15 out of the die magazine 10, the operator specifies the particular die assembly 15 to be taken out, by the touch panel 46. Then, the desired die assembly 15 is taken out of the die magazine 10 and the common data on this die assembly 15 is erased while the punch data and die data being marked with a code indicating "out of the magazine". After grinding the die assembly 15, the bar codes of the punch 16 and die 18 are respectively read by the bar code reader 40 and the numerical control unit performs the same check (described earlier) as carried out when a new die assembly is stocked in the die magazine 10, so that new common data is prepared. If the punch data or die data marked with the code indicating "out of the magazine" do not have the same manufacturing date and production number as those of the bar code of the punch 16 or die 18, new punch data or die data will be prepared in the same way as described when a new die assembly is stocked in the die magazine 10. If the punch data or die data has the same manufacturing date and production number, these pieces of information are used without change. The amount of reduced height and the number of punching operations are updated by the touch panel 46, if necessary.

When taking out a desired die assembly 15 in order to change the combination of the punch 16 and die 18 and stocking a rear-ranged die assembly 15 in the die magazine 10, the same procedure as described in the case of restocking after grinding is taken.

The die management according to this embodiment is performed based on the die assembly information, and therefore it is possible to administer the number of times each punch has been used (i.e., the life of each punch) separately from the number of times each die has been used (i.e., the life of each die). If a combinations of a punch and die is altered, the latest data on the number of punching operations will not be lost so that strict life control can be ensured. Further, a check is made on a combination of a punch and die whenever a die assembly is stocked, which prevents mismatching without fail. Interchange between the press tool and the pressing program is completely automated so that an error such as inconsistencies in finished articles from the pressing program can be avoided.

While identification numbers are assigned to dies and punches and bar code tags corresponding to the respective identifications numbers are used in the foregoing embodiment, two-dimensional bar codes which enable high-density data recording may be used. In this case, a bar code of about 5 mm square can be marked on a die (or punch) itself and the bar code can be prevented from being rubbed out, by marking the bar code on a cut-away portion provided in a part of the die (or punch). Examples of such two-dimensional bar codes are "VERI CODE" produced by Mitsubishi Corporation, "DATA CODE" produced by Itochu Electronics, "CALRA CODE" produced by Calra System, and "PDF417" produced by Olympus Symbol.

In the foregoing embodiment, of die information, fixed data (i.e., read-only data) is held by a die (or punch) itself and update date is stored in the numeral control unit of the punch press. However, a die (or punch) may hold all the contents of its own die information. In this case, a magnetic chip or IC chip may be embedded in a die (or punch) to hold die information.

In cases where magnetic chips are embedded in dies and punches, representative examples of the data to be held by each punch 16 are shape (e.g., elongated rectangular shape), size (e.g., 5×50 mm), punch height, the amount of reduced height (initial value =0), the number of punching operations (initial value=0), and the limit number of punching operations (initial value=0). Representative examples of the data to be held by each die 18 are shape, size, clearance (e.g., 0.2 mm), die height, the amount of reduced height (initial value=0), the number of punching operations (initial value= 0), and the limit number of punching operations (initial value=0). Representative examples of the data to be input in the numerical control unit are (i) shape, size and clearance (common data on the punch 16 and die 18); (ii) punch height, the amount of reduced height, the number of punching operations and the limit number of punching operations (punch data); and (iii) die height, the amount of reduced height, the number of punching operations and the limit number of punching operations (die data).

In the case of embedded magnetic chips, after stocking a die and punch in the die magazine in response to the operator's instruction, data are automatically read from the magnetic chips and then the same data check as carried out in the case of the bar code tags is performed in the numerical control unit. Of the common data on the punch 16 and die 18, shape and size data are obtained from the magnetic chip of the punch 16, while clearance data is obtained from the magnetic chip of the die 18 or alternatively newly calculated in the way described earlier. Punch data and die data are all obtained from the magnetic chips of the punch 16 and die 18, respectively. As to the amount of reduced height, the number of punching operations, and the limit number of punching operations, the operator inputs new data for correction through the touch panel 46, if necessary.

After taking-out of the punch 16 and die 18 has been done in response to the operator's instruction, the amount of reduced height, the number of punching operations and the limit number of punching operations of the punch data are written in the magnetic chip of the punch 16, whilst the amount of reduced height, the number of punching operations and the limit number of punching operations of the die data are written in the magnetic chip of the die 18. Thereafter, the common data, punch data and die data are all erased.

The use of such magnetic chips eliminates the necessity to keep the punch data and die data related to the punch and die which are being ground, which reduces the memory capacity of the numerical control unit. This also eliminates the necessity to keep the data (i.e., manufacturing date and production number) which correlates the punch data and die data on the punch and die being ground with the bar code data, so that the memory capacity of the numerical control unit can be reduced. While the bar codes must be free from dust because they are read by optical scanning devices, magnetic chips have no problem in being incorporated in dies, which facilitates automatic reading and writing of die information.

Although the die assembly information and others of the foregoing embodiment are stored in the numerical control unit incorporated in the punch press, they may be stored in an external control unit which is separately installed from the punch press.

Although the punches and dies are respectively provided with identification numbers (i.e., punch ID and die ID) and the strippers are treated as an accessory for the punch, each stripper is preferably provided with an identification number (i.e., stripper ID) particularly when molded dies and punches are used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A die management method for a punch press provided with a die replacement system, the method comprising the steps of:

storing die information on an upper die and on a lower die to be used for pressing operation and storing die assembly information on a die assembly in which the upper and lower dies are combined in a pair;

storing information on the address of the die assembly stocked in the punch press in connection with the die assembly information; and performing die replacement by fetching the die assembly according to the die assembly information to start punching operation.

2. The die management method for a punch press as claimed in claim 1, wherein the die assembly information and address information are stored in a numerical control unit connected to the punch press.

3. The die management method for a punch press as claimed in claim 1 or 2, wherein the die assembly information comprises shape, size and die clearance.

4. The die management method for a punch press as claimed in claim 2, wherein, of the die information, fixed data is held by the corresponding upper or lower die itself while update data is held in the numerical control unit of the punch press.

5. The die management method for a punch press as claimed in claim 4, wherein the fixed data comprises the production number and manufacturing date of the corresponding upper or lower die.

6. The die management method for a punch press as claimed in claim 4 or 5, wherein bar codes are respectively marked on the surfaces of the upper and lower dies and the bar codes are read by a reader to input the fixed data in the numerical control unit.

7. The die management method for a punch press as claimed in claim 4 or 5, wherein identification numbers are respectively marked on the surfaces of the upper and lower dies and bar code tags, which correspond to the identification numbers and are provided separately from the identification numbers, are read by a reader to input the fixed data in the numerical control unit.

8. The die management method for a punch press as claimed in claim 1 or 2, wherein all the contents of the die information are held by the corresponding upper or lower die itself.

9. The die management method for a punch press as claimed in claim 8, wherein magnetic chips are respectively embedded in the upper and lower dies and the die information is held by the magnetic chip of the corresponding upper or lower die.

10. The die management method for a punch press as claimed in claim 8, wherein IC chips are respectively embedded in the upper and lower dies and the die information is held by the IC chip of the corresponding upper or lower die.

11. The die management method for a punch press as claimed in claim 1 or 2, wherein when inputting the die information on the upper die and the die information on the lower die, they are compared with each other in terms of shape, size and clearance, so that a check can be made to determine whether the particular combination of the upper and lower dies is appropriate.

12. The die management method for a punch press as claimed in claim 11, wherein if the upper and lower dies have the same shape and size or if the upper and lower dies differ from each other in size but have the same shape on condition that the clearance falls within an allowable range, the particular combination of the upper and lower dies is judged to be applicable.

\* \* \* \* \*